Figure 1:
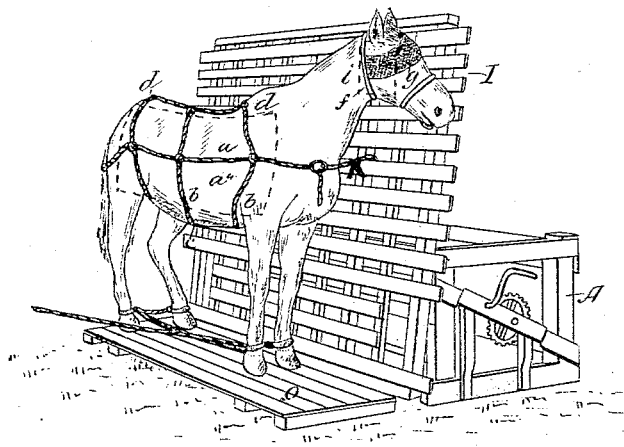

(No Model.)  L. C. TIFFANY.  2 Sheets—Sheet 1.

HARNESS FOR VETERINARY PURPOSES.

No. 378,153.  Patented Feb. 21, 1888.

(No Model.) 2 Sheets—Sheet 2.
L. C. TIFFANY.
HARNESS FOR VETERINARY PURPOSES.
No. 378,153. Patented Feb. 21, 1888.
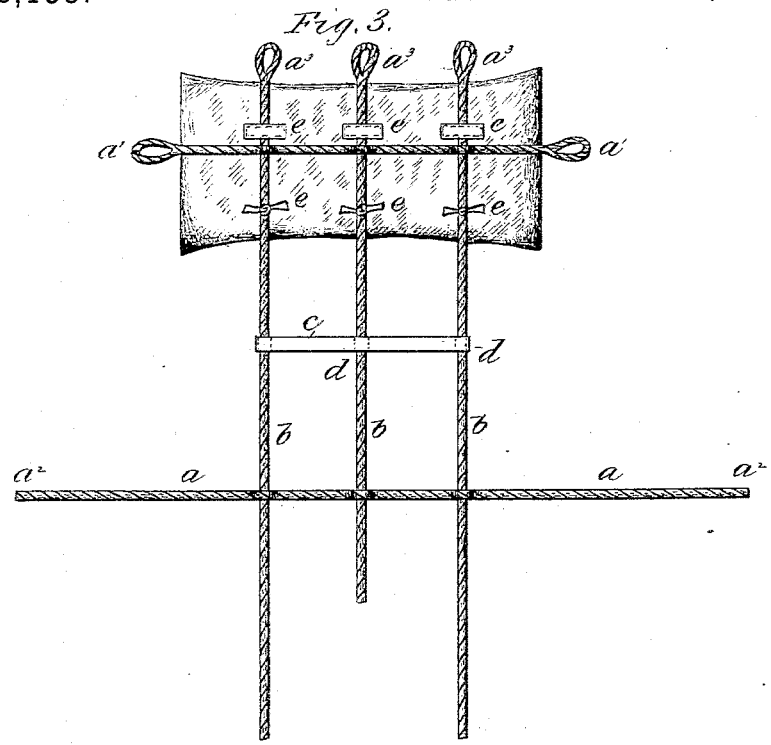
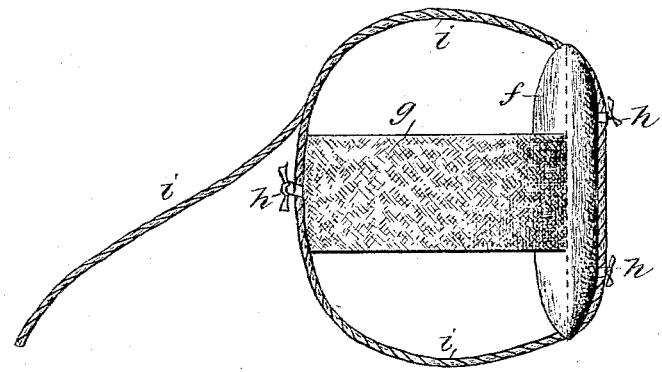
Witnesses:
J. R. Stuart
L. Seward Bacon
Inventor:
L. C. Tiffany,
By Emmarbee,
Atty.

UNITED STATES PATENT OFFICE.

LANSING C. TIFFANY, OF JACKSONVILLE, ILLINOIS.

HARNESS FOR VETERINARY PURPOSES.

SPECIFICATION forming part of Letters Patent No. 378,153, dated February 21, 1888.

Application filed February 16, 1887. Serial No. 227,780. (No model.)

*To all whom it may concern:*

Be it known that I, LANSING C. TIFFANY, a citizen of the United States, residing at Jacksonville, in the county of Morgan and State of Illinois, have invented certain new and useful Improvements in Harness for Veterinary Purposes, &c.; and I do hereby declare the following to be a full, clear, and exact description of the invention, such as will enable others skilled in the art to which it appertains to make and use the same.

My invention primarily relates to improvements in harness and tables for veterinary purposes, such as for throwing and confining horses or other large animals to be acted upon surgically, although it may be applied to other uses, such as the shoeing of vicious or unbroken horses or mules and the holding of draft oxen or other animals with various objects in view; and it consists in the peculiar construction and combination of parts hereinafter described and claimed.

In the drawings forming part of this specification the same reference-letters are used to refer to the same parts.

Figure 2:
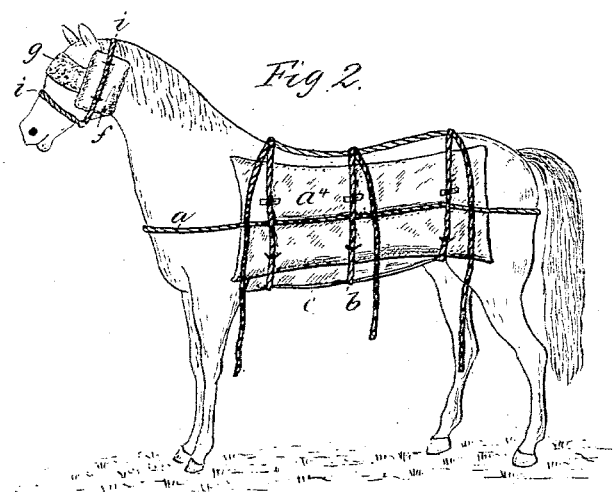

Figure 1 represents a perspective view of the rectangular frame, the movable platform, the tilting table, and a horse mounted on said platform and equipped with my improved harness, the cushion and the pillow of the latter being shown in dotted outline on the side of the harness next the said table. Fig. 2 represents a side view of the horse equipped with my improved harness on the side opposite to that shown in Fig. 1, showing the cushion and the pillow in full outline. Fig. 3 is a detail view of the harness with the cushion applied thereto, and Fig. 4 is a detail view of the pillow and blindfold attached to a halter.

The rectangular frame A, the movable platform O, the tilting or movable frame I, and the devices for operating the latter to adjust it into different positions are described and claimed in a patent granted to me October 12, 1886, No. 350,646, and therefore need not be herein again specifically described. They are shown, however, to convey an intelligent understanding of the practical application or combination of my new or improved harness with one form of veterinary table. Also, parts of my present improved harness are shown in said patent; but they are neither claimed therein nor practically or operatively disclosed in the description or drawings, or both. Hence, there being no disclosure of the manner of making or using said harness, the public could derive no benefit therefrom after the expiration of said patent; but I have added to and improved upon said harness in the particulars hereinafter specified.

In the drawings, $a$ $a$ represent the ropes or straps which pass along the sides of the animal and meet at the front and rear, where they are secured together by looping or tying, or both, if necessary, or by straps and buckles or other ordinary fastening devices. In this instance one of them is shown as looped at its ends, as at $a'$, while the ends $a^2$ $a^2$ of the other are adapted to pass through said loops and be tied or otherwise secured. The side straps may also be constructed to connect at their front and rear ends with a neck or breast band and breeching.

To the side straps or ropes, $a$ $a$, are attached in any suitable way transversely-extending straps or ropes $b$ $b$, which pass around the body of the animal and constitute the girths. These girths are each provided with a loop, $a^3$, at one end, the other end being plain and passing through said loop, and being secured by tying or otherwise. Intermediate of the two side straps, and extending in a line along the abdomen of the animal, is a strap, $c$, which is formed or provided with loops or guides $d$ $d$, for supporting and holding the girths in line with their points of attachment to the side straps. I have illustrated three girths—one passing close behind the fore legs, another in front of the hind legs, and the third intermediate of the other two, or around the middle of the body of the animal. Also, I regard a single wide band, girth, or apron covering the abdomen of the animal as an equivalent of three girths; but it will be evident that the number and arrangement of said girths are mere matters of judgment, and hence I do not wish to be limited to such minor details in carrying out this part of my invention.

The front and back girths, and also a portion of the breast-band and breeching, if desired, are formed of sufficient length for their ends to extend some distance out from the main body of the harness, so that said ends can be attached to the veterinary table or to its operating mechanism after the horse has been harnessed and led upon the platform O in a position opposite the said table or frame.

I contemplate making my harness of either rope, as shown, leather, or other suitable flexible material. It is entirely separate and distinct from the table, and its operating mechanism being applied to the animal before he is brought to said table; but it is designed, of course, to be fastened to said table or its operating mechanism by the means described, or by separate ropes, chains, or straps, or other method, so as to confine the animal thereto laterally after being placed in proper position.

As my harness is detached from or is not normally attached to the operating-table or its mechanism, it can be used not only in connection with the form of table shown in Fig. 1 of the drawings, but with any other form of table for veterinary or like purposes. Also, from the above description of the construction and arrangement of parts it will be evident that my harness as a whole is reversible end for end, for a purpose hereinafter to be described.

My harness is provided with an adjustable cushion, $a^4$, for protecting the side of the animal from bruises or other injury while confined upon the operating-table. Said cushion is made of canvas, leather, or other suitable material of any desired shape and size, and filled or stuffed with some soft fibrous material, and sewed or otherwise fastened. It is furnished with loops $e\ e\ e$, through which the girths pass and are held in place upon the side of the animal, said cushion being attached to the inside of the harness; or, instead of by loops, it may be attached to the harness by straps and buckles, so that it may be readily removed when desirable.

As above stated, the entire harness is reversible. It has this capability in order that the cushion may be moved or transferred from one side of the animal to the other, so as to protect either side from injury while the other is undergoing treatment by the operator; or, with the same end in view, the said cushion may be provided with its own or independent straps or girths and fastening devices therefor, whereby it may be directly attached to the body of the animal.

I also provide my harness with a pillow, $f$, which is attached to a blindfold, $g$, said pillow being made of any suitable shape, size, and material, and filled with some soft fibrous or yielding substance, and sewed or otherwise secured. The purpose or use of this pillow is the prevention of the head of the animal from injury while the body or other portion is undergoing veterinary or other treatment upon the table. I have shown said pillow as secured to or combined with the blindfold; but it is obvious that it may be detachably secured thereto by means of straps and buckles, strings, or other ordinary means, so as to render it capable of detachment from one side of the head and attachment to the other side, so as to agree with the reversed position of the harness and cushion.

As shown in the drawings, the pillow and blindfold are removably attached to the halter $i$ by strings $h$, which are tied and untied at pleasure; or they may be secured to said halter by straps and buckles. I also regard it as within the scope of my invention to secure either or both of them directly to the head and neck of the animal by a strap or straps and buckles, independent of the halter.

My harness and its adjuncts, as thus constructed, arranged, and adapted for use in connection with a tilting table, is cheap, simple, strong, and not liable to get out of order, and will be found of great advantage or utility to veterinary surgeons and others who have occasion to confine horses or other animals for treatment.

I am aware of the expired patent to F. Vogeli, No. 48,225, June 13, 1865, and do not claim as my invention anything therein shown or described.

Having thus described my invention, I claim as follows:

1. A harness for veterinary or other uses, consisting of the side straps, $a$, the strap $c$, and one or more girths or bands, $b$, having one or more extended ends for detachably connecting said harness to a tilting table, substantially as described.

2. The combination, with a tilting table, of a harness for veterinary or other uses, consisting of the side straps, $a$, the strap $c$, and one or more girths or bands, $b$, having one or more extended ends for detachably connecting said harness to said tilting table, substantially as described.

3. An independent harness for veterinary and analogous purposes, consisting of the side straps, $a\ a$, strap $c$, and bands and girths $b\ b$, having ends extending from the main portion of said harness and adapted to be removably secured to a tilting table or its operating mechanism, substantially as described.

4. A harness for veterinary and analogous uses, comprising side straps, $a$, strap $c$, one or more girths or bands, $b$, having one or more extended ends, a cushion, $a^4$, having straps or loops $e\ e$, and a pillow, $f$, provided with suitable attaching devices, substantially as described.

In testimony whereof I affix my signature in presence of two witnesses.

LANSING C. TIFFANY.

Witnesses:
JNO. F. CLARK,
ARTHUR T. MARSH.